United States Patent
Schnelker et al.

(10) Patent No.: US 9,127,780 B2
(45) Date of Patent: Sep. 8, 2015

(54) SOLENOID VALVE

(75) Inventors: Franz-Josef Schnelker, Neuss (DE); Werner Buse, Kaarst (DE); Christoph Sadowski, Bochum (DE); Rolf Lappan, Cologne (DE); Rolf Dohrmann, Kaarst (DE)

(73) Assignee: PIERBURG GMBH, Neuss (DE)

( * ) Notice: Subject to any disclaimer, the term of this patent is extended or adjusted under 35 U.S.C. 154(b) by 54 days.

(21) Appl. No.: 13/994,136

(22) PCT Filed: Nov. 15, 2011

(86) PCT No.: PCT/EP2011/070122
§ 371 (c)(1),
(2), (4) Date: Jun. 14, 2013

(87) PCT Pub. No.: WO2012/079890
PCT Pub. Date: Jun. 21, 2012

(65) Prior Publication Data
US 2013/0284961 A1    Oct. 31, 2013

(30) Foreign Application Priority Data

Dec. 17, 2010 (DE) .......................... 10 2010 055 025

(51) Int. Cl.
*H01F 7/08* (2006.01)
*F16K 31/06* (2006.01)

(52) U.S. Cl.
CPC ......... *F16K 31/0658* (2013.01); *F16K 31/0675* (2013.01)

(58) Field of Classification Search
CPC ..... H01H 51/065; H01H 33/53; H01H 33/32; H01H 33/34; H01H 33/80; H01H 33/82; H01H 33/86; H01F 7/06; H01F 5/00
USPC ......................................................... 335/220
See application file for complete search history.

(56) References Cited

U.S. PATENT DOCUMENTS

| 3,683,232 | A | * | 8/1972 | Heinz Baur | ..................... 315/58 |
| 3,829,060 | A | | 8/1974 | von Lëwis | |
| 4,326,696 | A | | 4/1982 | Ishikawa et al. | |
| 5,160,116 | A | | 11/1992 | Sugiura et al. | |
| 5,358,215 | A | * | 10/1994 | Buth et al. | ............... 251/129.21 |
| 5,518,029 | A | * | 5/1996 | Schumacher et al. | ... 137/625.65 |
| 5,860,632 | A | * | 1/1999 | Buth et al. | ............... 251/129.15 |
| 5,921,526 | A | * | 7/1999 | Najmolhoda | ................... 251/65 |
| 6,209,563 | B1 | | 4/2001 | Seid et al. | |

(Continued)

FOREIGN PATENT DOCUMENTS

| DE | 2 208 183 A | 8/1973 |
| DE | 40 07 009 A1 | 9/1990 |

(Continued)

*Primary Examiner* — Shawki S Ismail
*Assistant Examiner* — Lisa Homza
(74) *Attorney, Agent, or Firm* — Norman B. Thot

(57) ABSTRACT

A solenoid valve includes a housing within which is arranged a coil wound onto a coil former, an armature, a core, and a multiple-part return path arrangement, which together form an electromagnetic circuit. The armature is configured to be movable and to act at least indirectly on a valve closure element mounted in the coil former via a bearing. The multiple-part return-path arrangement comprises at least one return-path cover section, a return-path side section and a return-path inner section. The return-path inner section is arranged in the coil former.

11 Claims, 1 Drawing Sheet

(56) References Cited

U.S. PATENT DOCUMENTS

| | | | |
|---|---|---|---|
| 6,220,275 B1* | 4/2001 | Nishinosono et al. | 137/238 |
| 6,321,767 B1 | 11/2001 | Seid et al. | |
| 2002/0145125 A1 | 10/2002 | Tomoda et al. | |
| 2003/0174034 A1* | 9/2003 | Sudani et al. | 335/220 |
| 2005/0274336 A1 | 12/2005 | Wagner et al. | |
| 2009/0166274 A1* | 7/2009 | Newby et al. | 210/137 |
| 2010/0019186 A1 | 1/2010 | Keller et al. | |
| 2010/0090142 A1 | 4/2010 | Schmid et al. | |
| 2011/0037006 A1 | 2/2011 | Zurke et al. | |
| 2011/0121214 A1* | 5/2011 | Stoeckel et al. | 251/129.01 |
| 2012/0242437 A1* | 9/2012 | Buse et al. | 335/298 |
| 2013/0112293 A1* | 5/2013 | Buse et al. | 137/505 |
| 2013/0264506 A1* | 10/2013 | Schnelker et al. | 251/129.15 |
| 2013/0264507 A1* | 10/2013 | Schnelker et al. | 251/129.15 |
| 2013/0284960 A1* | 10/2013 | Schnelker et al. | 251/129.15 |
| 2013/0284961 A1* | 10/2013 | Schnelker et al. | 251/129.15 |
| 2013/0302545 A1* | 11/2013 | Schnelker et al. | 428/34.1 |

FOREIGN PATENT DOCUMENTS

| | | | | |
|---|---|---|---|---|
| DE | 40 41 416 A1 | 7/1991 | | |
| DE | 43 05 789 A1 | 9/1994 | | |
| DE | 694 11 642 T2 | 11/1998 | | |
| DE | 198 26 578 A1 | 12/1999 | | |
| DE | 102 52 431 A1 | 5/2004 | | |
| DE | 10 2006 046 825 A1 | 4/2008 | | |
| DE | 10 2007 002 465 A | 7/2008 | | |
| DE | 10 2007 036 925 A1 | 2/2009 | | |
| DE | 10 2008 020 042 A1 | 10/2009 | | |
| DE | 102008020042 | * 10/2009 | | H01F 5/02 |
| DE | 10 2008 022 851 A1 | 12/2009 | | |
| JP | H03 43183 U | 4/1991 | | |
| JP | H03 43186 U | 4/1991 | | |
| JP | H 08 105563 A | 4/1996 | | |
| JP | 2000-2343 A | 1/2000 | | |
| WO | WO 2007/065566 A1 | 6/2007 | | |
| WO | WO 2008/147954 A1 | 12/2008 | | |

* cited by examiner

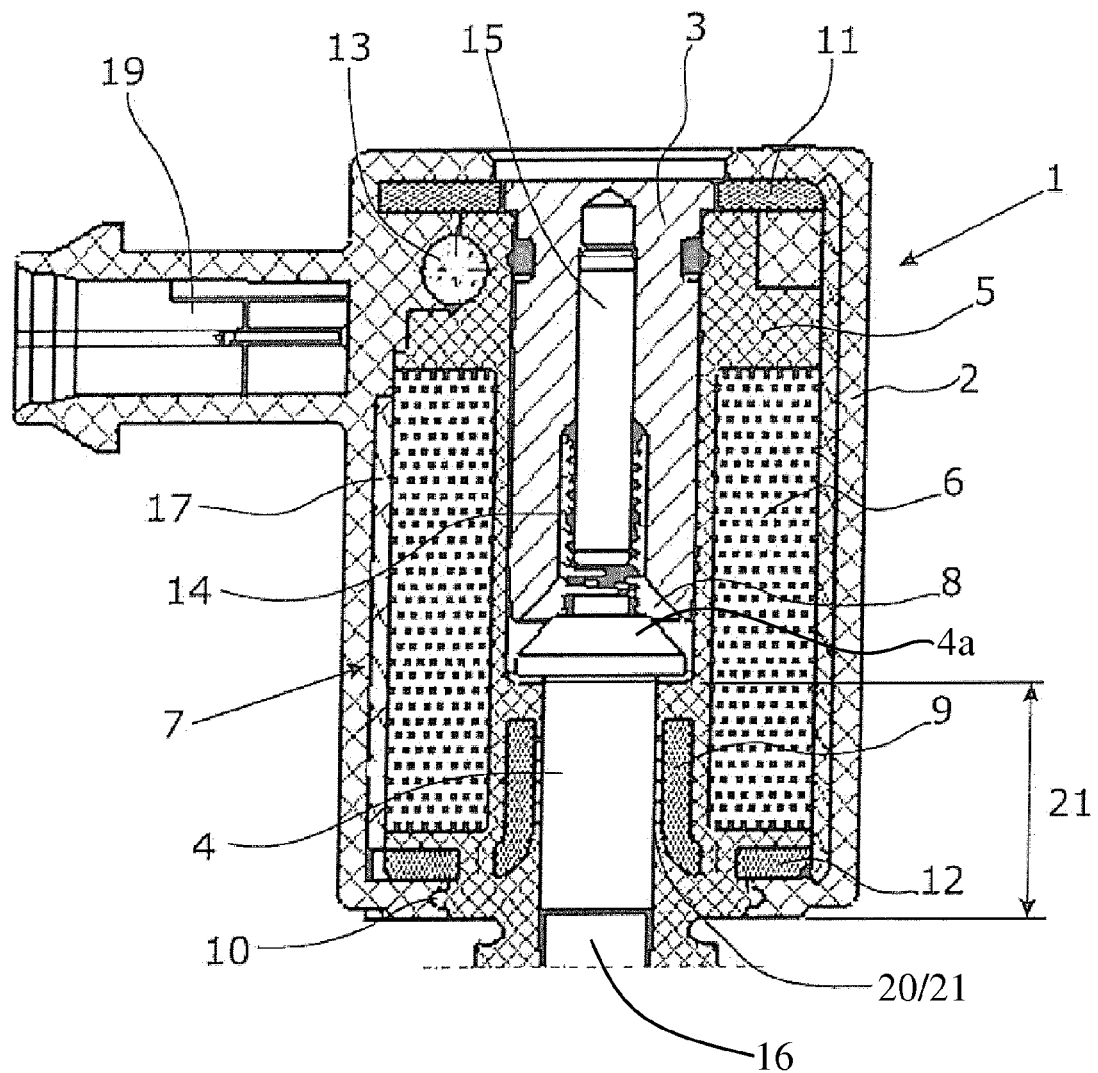

SOLENOID VALVE

CROSS REFERENCE TO PRIOR APPLICATIONS

This application is a U.S. National Phase application under 35 U.S.C. §371 of International Application No. PCT/EP2011/070122, filed on Nov. 15, 2011 and which claims benefit to German Patent Application No. 10 2010 055 025.6, filed on Dec. 17, 2010. The International Application was published in German on Jun. 21, 2012 as WO 2012/079890 A1 under PCT Article 21(2).

FIELD

The present invention relates to a solenoid valve having a housing, in which a coil which is wound onto a coil former, an armature, a core and a multiple-part return-path arrangement with return-path cover sections, return-path side sections and return-path inner sections are arranged, which form an electromagnetic circuit, wherein the movable armature is mounted in the coil former via bearing means and acts at least indirectly on a valve closure element, wherein at least the return-path inner sections are arranged in the coil former.

BACKGROUND

Solenoid valves are used in various fields of application in internal combustion machines. Solenoid valves are used both in pneumatic and in hydraulic circuits in vehicles, such as in brake equipment, brake systems or injection systems. They can moreover be used to control the pressure of pneumatic actuators or as divert-air valves in, for example, turbochargers. Depending on the field of application, these solenoid valves are configured either as open/close valves or as proportional control valves.

Such a solenoid valve, configured as a pressure control valve, is described in DE 10 2006 046 825 A1. This publication describes a particularly simple embodiment of a return-path arrangement that supposedly avoids great magnetic force dispersion. The structure of the return-path arrangement, which is of great importance in adjusting the magnetic force, is, however, still very assembly-intensive, since the return-path arrangement composed of several components can be finished only during the final assembly of the solenoid valve. The coaxial offset of the armature in the magnetic circuit is further a great problem since radial forces caused have a negative influence on the desired axial forces.

SUMMARY

An aspect of the present invention is to provide a solenoid valve that avoids the above disadvantages.

In an embodiment, the present invention provides a solenoid valve which includes a housing within which is arranged a coil wound onto a coil former, an armature, a core, and a multiple-part return path arrangement, which together form an electromagnetic circuit. The armature is configured to be movable and to act at least indirectly on a valve closure element mounted in the coil former via a bearing. The multiple-part return-path arrangement comprises at least one return-path cover section, a return-path side section and a return-path inner section. The return-path inner section is arranged in the coil former.

BRIEF DESCRIPTION OF THE DRAWINGS

The present invention is described in greater detail below on the basis of embodiments and of the drawings in which:

FIG. 1 shows an embodiment of the solenoid valve of the present invention.

DETAILED DESCRIPTION

An embodiment of the present invention includes a solenoid valve in which at least the return-path inner sections are arranged in the coil former. In an advantageous embodiment, the return-path inner sections are of a single-part design, where it is also advantageous to form the return-path inner section and parts of the return-path cover sections integrally. It is further advantageous under aspects of assembly to also form the return-path side sections integrally.

In an embodiment of the present invention, in order to provide a high degree of coaxiality, the bearing means are formed by the coil former. For this purpose, the coil former may have a sliding layer in the bearing region.

In an embodiment of the present invention, it is possible to augment the degree of pre-assembly by providing an interference suppression resistance in the coil former.

In an embodiment of the present invention, the coil former is manufactured in a plastic injection molding process. The coil former may be formed from a dimensionally and temperature stable material, such as Grivory® HT2V or Grivory® XE388.

A solenoid valve 1 illustrated in FIG. 1 comprises a housing 2 in which are arranged a core 3, an armature 4, a coil former 5 with a coil 6 wound thereon, and a return-path arrangement 7. In an embodiment of the present invention, the armature 4 is connected with a valve closure element which is configured such that the solenoid valve 1 can be used as an oil pressure control valve.

Such a solenoid valve operates as follows: In the de-energized state, a gap 8 exists between the armature 4 and the core 3, in which a magnetic field is generated when the coil 6 is energized, whereby an axial movement of the armature 4 is caused. The valve element connected with the armature 4 is also correspondingly moved. The coaxial arrangement of the armature is important for an optimal functioning of the solenoid valve.

In an embodiment of the present invention, a return-path inner section 9 is formed integrally with the return-path cover section 12 averted from the core 3, and is arranged in a manner integrated in the coil former 5. In an embodiment, the return-path inner and cover sections 9, 12 have been included when the coil former 5 was manufactured in an injection molding process. An interference suppression resistance 13 is already provided in the coil former 5. Essential components can be provided in the coil former 5 during pre-assembly in this manner. During the manufacture of a standard coil component, it is thus only necessary to select the coil 6 chosen for the valve function and to mount it on the coil former 5. After the second return-path cover section 11 has been placed and the return-path side section 17 has been engaged in a pressed connection with the return-path cover sections 11, 12 such that an electromagnetic circuit can be formed, and the contacting with an electric plug 19 has been made, the solenoid valve 1 is finished by being overmolded with the outer housing 2. In doing so, a contour is provided between the outer housing 2 and the coil former 5, which provides a kind of labyrinth-like seal 10 in order to increase the effect of sealing from the atmosphere.

In an embodiment of the present invention, the solenoid valve is then finished by arranging the core 3, the armature 4 and the associated components, such as a spring 14 that, in the present case maintains the armature 4 under a bias, as well as a stop pin 15 adjustably provided in the core 3. It is here useful for positioning if a portion of the core 3 opposite the armature 4 has a larger diameter than a portion of the coil former 5 opposite the valve closure element 16.

In an embodiment of the present invention, bearing means 20 for the armature 4 are formed by the coil former 5, the bearing region 21 substantially coinciding with the region in which the return-path inner section 9 is provided. This embodiment becomes possible due to the fact that a first part 4*a* of the armature, facing towards the core, has a diameter that is larger than the inner diameter of a portion 21 of the coil former 5. Besides the assembly advantage, this is advantageous in that the bearing region 21 of the coil former 5 is positively reinforced by the inclusion of the return-path inner section 9. By applying a sliding layer hi the bearing region 21, it is provided that the armature slides in the coil former with as little resistance as possible. The coaxial guiding of the armature 4 in the solenoid valve is provided by the double function of the coil former 5 which, on the one hand, receives the core 3 and, on the other hand, acts as bearing means for the armature 4. It is also possible to provide a bearing bushing in the region 21.

It has proven to be advantageous to form the coil former 5 from a dimensionally and temperature stable material such as, for example, Grivory® HT2V 3HLV, Grivory® XE388, PPA or PA 4.6.

The present invention is not limited to embodiments described herein; reference should be had to the appended claims.

What is claimed is:

1. A solenoid valve comprising:
   a housing within which is arranged:
      a coil wound onto a coil former;
      an armature configured to be movable and to act at least indirectly on a valve closure element is mounted in the coil former via a bearing;
      a core; and
      a multiple-part return-path arrangement comprising at least one return-path cover section, a return-path side section and a return-path inner section,
      wherein, the coil, the armature, the core, and the multiple-part return path arrangement together form an electromagnetic circuit, and
      the return-path inner section is arranged entirely inside the substance of the coil former and is integrated inside the coil former.

2. The solenoid valve as recited in claim 1, wherein the return-path inner section is formed integrally.

3. The solenoid valve as recited in claim 1, wherein the return-path inner section and at least a portion of the at least one return-path cover section are formed integrally.

4. The solenoid valve as recited in claim 1, wherein the return-path side section is formed integrally.

5. The solenoid valve as recited in claim 1, wherein the coil former comprises a bearing region, the bearing being formed by the bearing region.

6. The solenoid valve as recited in claim 5, wherein the coil former further comprises a sliding layer in the bearing region.

7. The solenoid valve as recited in claim 1, further comprising an interference suppression resistance arranged in the coil former.

8. The solenoid valve as recited in claim 1, wherein the coil former is formed using an injection molding process.

9. The solenoid valve as recited in claim 1, wherein the coil former includes a dimensionally and temperature stable material.

10. The solenoid valve as recited in claim 9, wherein the dimensionally and temperature stable material comprises a glass fiber reinforced (30%), polytetrafluoroethylene (PTFE) modified engineering thermoplastic based on semi-crystalline partially aromatic copolyamid.

11. A solenoid valve comprising:
    a housing within which is arranged:
       a coil wound onto a coil former;
       an armature configured to be movable and to act at least indirectly on a valve closure element is mounted in the coil former via a bearing;
       a core; and
       a multiple-part return-path arrangement comprising at least one return-path cover section, a return-path side section and a return-path inner section,
       wherein,
       the coil, the armature, the core, and the multiple-part return path arrangement together form an electromagnetic circuit,
       the return-path cover section and the return-path inner section are not connected to each other, and
       the return-path inner section is arranged entirely inside the substance of the coil former and is integrated inside the coil former.

* * * * *